United States Patent Office 2,976,864
Patented Mar. 28, 1961

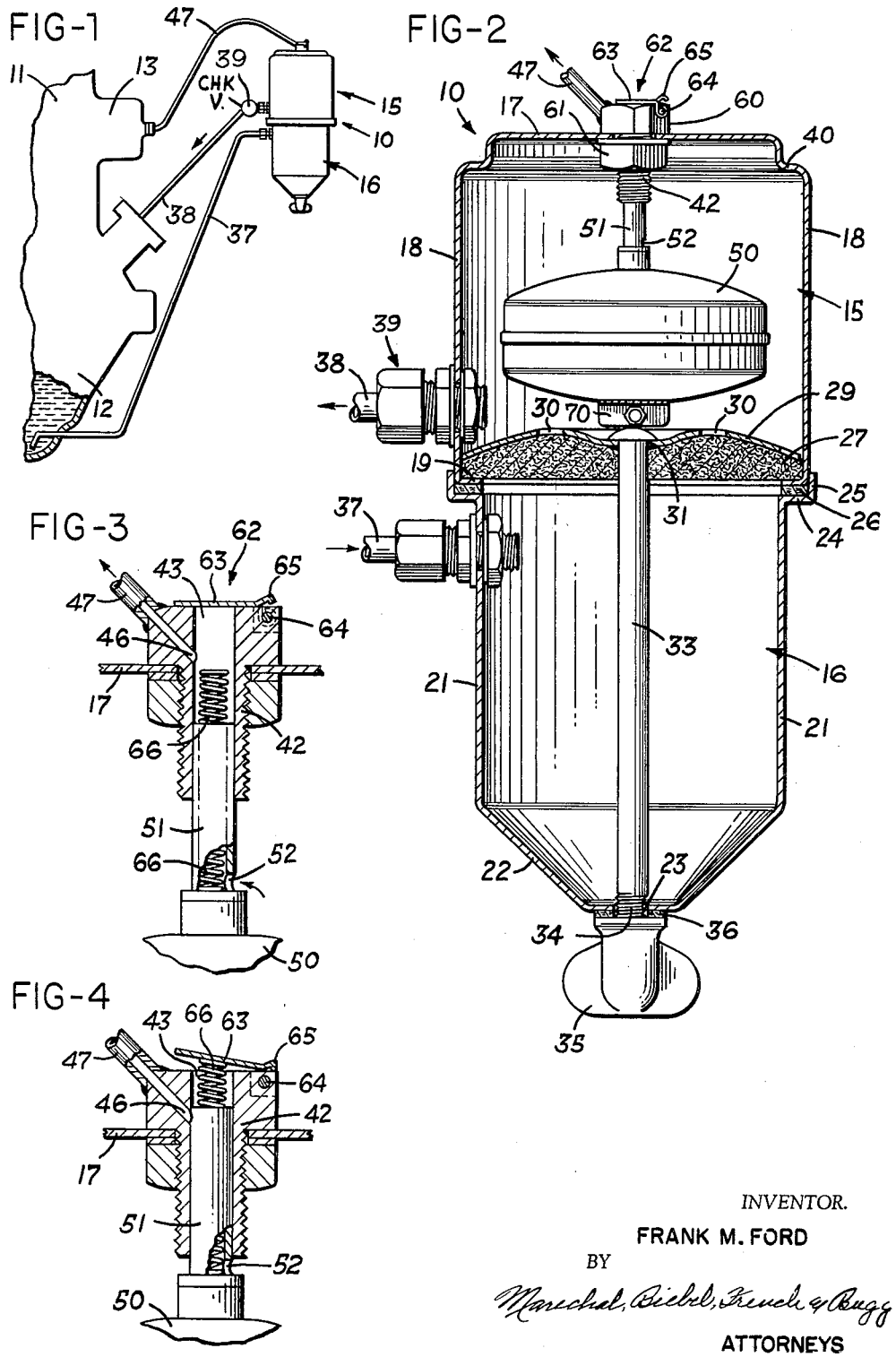

2,976,864

OIL PURIFYING APPARATUS

Frank M. Ford, 530 E. Main St., Bradford, Ohio, assignor of thirty-five percent to John Ford, Versailles, Ohio Filed Nov. 13, 1957, Ser. No. 696,277

5 Claims. (Cl. 123—196)

This invention relates to oil purifying apparatus.

The invention has particular relation to an oil filter for use with an internal combustion engine having a crankcase forming a reservoir holding a quantity of oil, and an intake manifold, in which the suction or vacuum by reason of the negative pressure developed in the manifold during operation of the engine is utilized to draw the oil from the crankcase and cause it to pass through a filtering medium into a closed chamber, and periodically the negative pressure is shut off and atmospheric pressure admitted into the chamber so as to provide for return flow of the oil to the crankcase reservoir by gravity. The negative pressure is thereupon again admitted to the chamber, and the chamber closed to the atmosphere, in a continuous cyclical operation. The invention is particularly adapted for use with such an engine of the type used to propel a motor vehicle, and is an improvement over the apparatus shown in U.S. Patent No. 1,926,741, issued September 12, 1933, of which the applicant is a co-inventor.

Such a filter used in a moving vehicle is subject to vibration and to bouncing and twisting incident to the shocks and jars during driving, and starting and stopping. It is particularly desirable that the device should operate smoothly and certainly irrespective of road and driving conditions, and also to minimize the amount of air in the chamber which may be drawn into the manifold and to avoid at all times during the operating cycle a direct passage between the atmosphere and the intake manifold such as would admit air into the manifold and adversely affect the air-fuel ratio of the mixture entering the cylinders.

It is accordingly a primary object of the present invention to provide such a filter having a positive snap action mechanism for opening and closing the air valve between the vacuum chamber and the atmosphere so as to produce a smooth, certain cyclical operation and avoid flapping or "chattering" of the valve so as to shut off introduction of air into the vacuum chamber promptly upon completion of the oil-return phase of the cycle, with introduction of air from the oil filter into the intake manifold reduced as far as practicable.

It is a further object of the invention to provide such a filter including a closed vacuum chamber in which the vacuum line from the engine manifold is positively shut off from the chamber when the chamber is open to the atmosphere so as to prevent direct passage of air from the atmosphere into the manifold at all times.

It is also an object of the invention to provide such a filter which offers the features and advantages noted above and comprises a relatively few component parts for economical fabrication, assembly, installation, and maintenance.

Further objects and advantages of the invention will be apparent from the following description, the accompanying drawings, and the appended claims.

In the drawings—

Fig. 1 is a somewhat diagrammatic perspective view showing a filter embodying the invention connected to an internal combustion engine;

Fig. 2 is a vertical section of the filter on a larger scale;

Fig. 3 is a detailed section on an enlarged scale showing the position of the control valves during the oil intake phase of the cycle; and Fig. 4 is a view similar to Fig. 3 showing the position of the control valves during the oil return phase of the cycle.

Referring to the drawings, which illustrate a preferred embodiment of the invention, Fig. 1 shows an oil purifying apparatus 10 in accordance with the invention operably connected with an internal combustion engine 11, indicated somewhat diagrammatically, having a crankcase 12 forming a reservoir adapted to hold a quantity of oil which is to be cleaned and an intake manifold 13 developing a negative pressure during operation.

The filter includes a generally cylindrical container having an upper chamber 15 and a lower chamber 16. The head 17 and sidewalls 18 defining chamber 15 are closed and its lower end is open except for an inwardly extending flange 19. Lower chamber 16 is defined by closed sidewalls 21 and a bottom 22, shown as frustoconical in shape with its apex extending downwardly to provide an area of reduced size for easier collection and removal of foreign matter, and is provided with an aperture 23 in the flat portion of its lower end for periodically cleaning out the lower container. Sidewalls 21 include an outwardly extending flange 24 around their upper edge, the flange having an outer rim 25 providing a seat for receiving the upper section of the container, and a gasket 26 is interposed between flanges 19 and 24 to insure an airtight joint between the closed upper chamber and lower chamber.

A filtering medium 27 is positioned between the two chambers to filter oil flowing between them, supported on flange 19 by its marginal area, and a plate 29 containing a plurality of perforations 30 for permitting passage of oil therethrough overlies the filtering medium. The filtering medium may conveniently be formed of felt, which has ample body to support itself, although as is clear any suitable filtering material adapted to clean the liquid to be filtered may be used and supported in an appropriate manner, as from plate 29. This plate is shown as concavo-convex in form, with its concave face disposed downwardly, and is provided with a centrally located aperture 31.

A bolt 33 extends axially through this aperture downward through aperture 23 and is threaded at 34 for receiving wingnut 35, with a washer 36 to insure a positive seal. The bolt thus serves to secure the two sections of the container together into an airtight container or vessel while providing for easy disassembly for cleaning and also for replacement of the filtering medium.

An oil intake pipeline 37 discharging at its upper end into lower chamber 16 is connected through the sidewall 21 of such chamber 16, with its other end adapted to communicate with crankcase 12 below the level of the oil in the reservoir therein, forming a supply connection for the flow of oil from the reservoir into the lower chamber. The lower end of pipeline 37 should preferably be positioned close to the bottom of the crankcase so as to draw up for filtering out any water, metal pieces or other foreign matter which may have settled there. An oil return pipeline 38 is similarly connected through the sidewall 18 of upper chamber 15 providing a return connection for the flow of filtered, clean oil from the upper chamber back into the reservoir. The upper end of pipeline 38 should be located in the lower part of sidewall 18 near but above the level of plate 29, and a one-way check valve indicated diagrammatically at 39 is connected into this return connection, adapted to be maintained in closed position by the negative pressure within chamber 15 to prevent reverse flow through such connection during the oil intake phase of the cycle, and to permit filtered oil to return to the crankcase when the negative pressure is shut off and atmospheric pressure is admitted into the container.

Head 17 of upper chamber 15 is preferably formed as shown in Fig. 2 with a central area of somewhat less diameter than that of the chamber providing an inwardly extending shoulder 40 for added strength. A fitting 42 having a passage 43 therein extending axially thereof extends through head 17, comprising at its upper end vent means connecting the interior of upper chamber 15 with the atmosphere, and providing the outer portion of a sleeve-like valve. Passage 43 is provided with a port 46 below the outer end thereof, which communicates with the upper end of a tube 47, the other end of which is adapted for connection to the intake manifold 13 of the engine providing a connection from the manifold to the upper chamber for transmitting to such upper chamber the negative pressure developed in the manifold during operation of the engine.

A float 50 is positioned in upper chamber 15, to which is secured a sleeve 51 having an aperture 52 near its lower end connecting its interior with that of upper chamber 15. Sleeve 51, which is closely but slidably received in passage 43 and is movable axially therein, is thus carried by float 50, and its length is such that it is operable in response to the rising and falling of the float between positions covering and uncovering port 46 opening into manifold connection 47 and forms a shut-off valve for the manifold connection.

As clearly appears in Figs. 3 and 4, fitting 42 is conveniently formed with its upper end of increased outer diameter and faceted as shown in the drawing to provide a head 60 and with its outer surface threaded at the lower end to receive a nut 61 for securing it to head 17. The top surface of the fitting is flat, and means for alternately opening and closing the upper chamber to the atmosphere are provided by an air valve indicated generally by the numeral 62, and comprised of plate 63 pivoted at 64 to lie flat against the surface of head 60, and adapted to be maintained in closed position thereagainst by the pressure differential across valve 62 between the atmosphere and the negative pressure transmitted to chamber 15 from the intake manifold. Plate 63 includes a stop 65 adapted to abut against part 60 and thus limit upward movement of the plate in the open position of the valve.

It is desirable that air valve 62 should open and close positively, without flapping or "chattering" during the periods at the start of the cycle when the negative pressure within chamber 15 and the corresponding pressure differential across the valve are relatively low. It is further desirable that opening of the air valve be delayed until after the shut-off valve to manifold connection 47 is closed so as to avoid direct passage between the atmosphere and the manifold at any time, with resulting disturbance of the air-fuel ratio of the mixture entering the cylinders.

Accordingly a yieldable connection is interposed between float 50 and air valve 62, arranged to exert an opening force upon valve 62 as sleeve 51 moves past port 46 to shut off tube 47 to the manifold. Such connection is provided by a coil-spring 66, as is shown in the drawings, positioned within sleeve 51 and extending above the upper end thereof in position to engage plate 63 as the spring and sleeve are carried upward by the rising of float 50 in response to the rising of the oil level in chamber 15. The strength of spring 66 is predetermined with respect to the closing force exerted upon valve 62 by the pressure differential across it, so that as the spring is compressed in response to continued rising of float 50, its force is gradually increased to the point at which it overcomes the closing force of the pressure differential at a predetermined oil level in chamber 15, and pushes the air valve into open position with a snap action, opening chamber 15 to the atmosphere, thus effecting relative increase in the pressure within chamber 15.

A cross-brace 70 may be removably secured across the interior of upper chamber 15, as indicated in Fig. 2, so as to limit downward movement of float 50 during operation to a level above that of plate 29, and also to retain the float within chamber 15 when the filter is disassembled for cleaning.

In use, the filter is secured in position adjacent the engine sufficiently above the crankcase reservoir to provide for return of filtered oil thereto by gravity, and connected into the oil reservoir of the engine, with the oil intake pipeline close to the bottom thereof so as to remove any foreign matter before it can pass into and possibly clog or damage the oil circulation system. Operation of the device will be clear from the foregoing description. When the engine is started, upper chamber 15 is free of oil and float 50 is at its lowest point, supported on cross-brace 70, with the upper end of sleeve 51 below port 46 forming the entrance to manifold connection 47. Thus the negative pressure developed in the manifold during operation of the engine is immediately communicated through the manifold connection into passage 43 and thence through sleeve 51 and aperture 52 into upper chamber 15. The resulting pressure differential across air valve 62 and check valve 39 holds both the air valve and the oil return connection closed. Inasmuch as lower chamber 16 is completely closed except for the discharge end of the oil supply connection 37, the negative pressure is effective in both chambers to cause the flow of oil from the reservoir through supply connection 37 into lower chamber 16 and upwardly through filtering medium 27 and the apertures 30 in plate 29 into upper chamber 15.

It will be noted that aperture 52 in sleeve 51 is above and close to float 50, and is accordingly shielded by the float from the oil in chamber 15. Additionally, port 46 is closed by sleeve 51 at all times when air valve 62 is open. Thus no oil nor undesirable air can be drawn into the manifold at any time.

As the oil flows upward into lower chamber 16, any water, acids, metal fragments or other matter heavier than the oil will tend to sink by gravity and remain in the lower cone-shaped portion of the chamber, where they may be periodically removed through aperture 23. Impurities which do not sink, such as particles of dust, carbon, and the like, are filtered out by the filtering medium 27 during the upward flow of the oil therethrough, so that only clean filtered oil enters the upper chamber.

As the oil level rises in chamber 15 it raises float 50, which carries sleeve 51 and spring 66 upward with it, effecting axial travel of the sleeve upward in passage 43 and closing port 46 at a predetermined level of the oil so as to close the shut-off valve and cut off the negative pressure connection 47. The residual negative pressure in chamber 15 is nevertheless effective to continue to cause upward flow of oil into the chamber, so that float 50 continues in its upward movement, bringing spring 66 into contact with plate 63 and exerting thereon an opening force which, in order to delay the action of opening plate 63 until after the closing of the shut-off valve, is at first less than the closing force on plate 63 by reason of the pressure differential across the plate. As the spring is further compressed by continued upward movement of float 50, this opening force is increased to the point at which, at a second predetermined level of the oil in chamber 15, it exceeds such closing force, and opens air valve 62 with a snap action and admits atmospheric air pressure to the upper and lower chambers. The resulting relative pressure increase in chamber 15 releases check valve 39 and the clean filtered oil returns by gravity through oil return connection 38 into the crankcase reservoir.

Plate 63 is prevented from opening beyond the desired position by stop 65. It is thus held positively open by the pressure of spring 66, and any likelihood of flapping or "chattering" is avoided. As the oil level sinks, float 50 carries sleeve 51 and spring 66 downward, below port 46, thus opening the manifold connection so as to again admit the negative pressure within the manifold into chamber 15.

The length of spring 66 is predetermined with respect to the distance between the manifold connection and plate 63 in its closed position so that the plate, which drops by gravity, is wholly or substantially in closed position before the connection to the manifold commences to be opened, and the negative pressure is thus immediately effective to secure the air valve closed. Thus the amount of air from the atmosphere admitted into the intake manifold through the oil filter is limited to the small quantity within the vacuum chamber, and unbalance of the air fuel ratio in the mixture entering the cylinders is reduced to a minimum.

During operation of the engine, the oil level in the upper chamber normally will not fall below the level of the filtering medium during the oil return phase before valve 62 is closed and port 46 opened and the oil starts to flow into the filter and its level to rise. When the engine ceases operating, however, the absence of negative pressure in the manifold, communicated to the container, will permit the filtered oil to pass back through the filtering medium into lower chamber 16 and thence by gravity through the oil supply connection 37 into the crankcase reservoir to the level at which such connection 37 enters chamber 16.

Inasmuch as the oil supply connection 37 discharges into lower chamber 16 at a point well above the conical bottom 22 thereof, foreign matter will accumulate in the bottom and may be removed periodically simply by unscrewing thumb screw 35. For normal periodic cleaning, drainage of the oil in the lower chamber in this manner will be all that is necessary. If desired, however, the apparatus may easily be disconnected, removed, and disassembled and given a thorough cleaning, and the filtering medium may be replaced when desired.

Since only filtered oil may enter chamber 15 at any time, all oil returning through the oil return connection 38 is fully clean and filtered.

Inasmuch as the device requires only the pressure differential resulting from the negative pressure developed in the engine manifold for operation, it can be used with either gasoline or diesel engines, and with those employing either an oil pump or a splash system of lubrication, irrespective of the number of cylinders or the horsepower developed. It has the advantage that, if one of the oil lines should break or a leak should develop in the device, the filter would not pump oil out of the crankcase as is possible with certain other forms of filters, but in such event the vacuum would be lost and the filter would cease to operate, without loss of oil and resulting damage to the engine. As will be apparent, it may be made in any desired size depending on the use to which it is to be put, and is not limited to the cleaning of oil but may be used in filtering other liquids provided an appropriate vacuum source is available.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An oil purifier for an internal combustion engine having a crankcase forming a reservoir adapted to hold a quantity of oil to be cleaned and having a manifold developing a negative pressure during operation, comprising a container having a closed upper and a closed lower chamber interconnected through an oil filter, a supply connection for the flow of oil from the reservoir into said lower chamber, a return connection for the flow of clean oil from said upper chamber back to the reservoir, a one-way check valve in said return connection preventing reverse flow therethrough, a fitting in the upper portion of said upper chamber, said fitting having a passage therein, the wall of said passage including a port, means adapted to connect the engine manifold with said passage for transmitting the negative pressure to be effective in both said chambers with resultant flow of oil from the reservoir through said supply connection into said lower chamber and upwardly through said filter into said upper chamber, a float in said upper chamber, a sleeve carried by said float and operable in response to the rising of said float to a predetermined level to close said port and shut off said passage from the negative pressure in the engine manifold, and means operable in response to the further rising of said sleeve beyond the port closing position thereof for admitting atmospheric air pressure to said chambers to provide for return flow of clean oil from said upper chamber through said return connection to the reservoir.

2. An oil purifier for an internal combustion engine having a crankcase forming a reservoir adapted to hold a quantity of oil to be cleaned and having a manifold developing a negative pressure during operation comprising a container having a closed upper and a closed lower chamber interconnected through an oil filter, a supply connection for the flow of oil from the reservoir into said lower chamber, a return connection for the flow of clean oil from said upper chamber back to the reservoir, a one-way check in said return connection preventing reverse flow therethrough, a fitting in the upper portion of said upper chamber, said fitting having a passage therein, the wall of said passage including a port, means adapted to connect the engine manifold with said passage for transmitting the negative pressure through said port to be effective in both said chambers with resultant flow of oil from the reservoir through said supply connection into said lower chamber and upwardly through said filter into said upper chamber, a float in said upper chamber, a sleeve connected to said float and operable in said passage in response to the rising of said float to a predetermined level for closing said port and shutting off said passage from the negative pressure in the engine manifold, an air admission valve on said fitting, and means operable in response to further movement of said sleeve beyond the port closing position thereof to open said air admission valve to provide for return flow of clean oil from said upper chamber through said return connection to the reservoir.

3. An oil purifier for an internal combustion engine having a crank case forming a reservoir adapted to hold a quantity of oil to be cleaned and having a manifold developing a negative pressure during operation, comprising a container having a closed upper and a closed lower chamber interconnected through an oil filter, a supply connection for the flow of oil from the reservoir into said lower chamber, a return connection for the flow of clean oil from said upper chamber back to the reservoir, a one-way check valve in said return connection preventing reverse flow therethrough, a float in said upper chamber, means adapted to connect the manifold to said upper chamber for transmitting the negative pressure in the manifold to said upper chamber to be effective in both said chambers with resultant flow of oil from the reservoir through said supply connection into said lower chamber and upwardly through said filter into said upper chamber, said manifold connection means including a passage in communication with said upper chamber and having a port adapted for communication with the manifold, vent means connecting said passage with the atmosphere, an air valve normally closing said vent means, valve means slidably received in said passage and carried by said float responsive to the rising of said float to a predetermined level to close said port for shutting off said passage from the negative pressure in the manifold, and means also carried by said float and responsive to further rising thereof beyond said port-closing position to move said air valve into open position for opening said upper chamber to the atmosphere to provide for return flow of oil in said upper chamber through said return connection to the reservoir.

4. An oil purifier for an internal combustion engine having a crank case forming a reservoir adapted to hold a quantity of oil to be cleaned and having a manifold developing a negative pressure during operation, comprising a container having a closed upper and a closed lower chamber interconnected through an oil filter, a supply connection for the flow of oil from the reservoir into said lower chamber, a return connection for the flow of clean oil from said upper chamber back to the reservoir, a one-way check valve in said return connection preventing reverse flow therethrough, a float in said upper chamber, means adapted to connect the manifold to said upper chamber for transmitting the negative pressure in the manifold to said upper chamber to be effective in both said chambers with resultant flow of oil from the reservoir through said supply connection into said lower chamber and upwardly through said filter into said upper chamber, said manifold connection means including a passage in communication with said upper chamber and having a port adapted for communication with the manifold, vent means connecting said passage with the atmosphere, an air valve normally closing said vent means, sleeve means slidably received in said passage and carried by said float responsive to the rising of said float to a predetermined level to close said port for shutting off said passage from the negative pressure in the manifold, and a yieldable connection positioned between said float and said air valve and responsive to further rising of said float beyond its port-closing position to move said air valve into open position after closing of said port for opening said upper chamber to the atmosphere to provide for return flow of oil in said upper chamber through said return connection to the reservoir.

5. An oil purifier for an internal combustion engine having a crank case forming a reservoir adapted to hold a quantity of oil to be cleaned and having a manifold developing a negative pressure during operation, comprising a container having a closed upper and a closed lower chamber interconnected through an oil filter, a supply connection for the flow of oil from the reservoir into said lower chamber, a return connection for the flow of clean oil from said upper chamber back to the reservoir, a one-way check valve in said return connection preventing reverse flow therethrough, a float in said upper chamber, means adapted to connect the manifold to said upper chamber for transmitting the negative pressure in the manifold to said upper chamber to be effective in both said chambers with resultant flow of oil from the reservoir through said supply connection inot said lower chamber and upwardly through said filter into said upper chamber, said manifold connection means including a passage in communication with said upper chamber and having a port adapted for communication with the manifold, vent means connecting said passage with the atmosphere, an air valve normally closing said vent means, a sleeve slidably received in said passage and carried by said float to respond to the rising of said float to a predetermined level to close said port for shutting off said passage from the negative pressure in the manifold, and a yieldable connection positioned between said float and said air valve responsive to further rising of said float for opening said air valve to the atmosphere with a snap action after closing of said port.

References Cited in the file of this patent

UNITED STATES PATENTS

| | | |
|---|---|---|
| 1,471,374 | Aland | Oct. 23, 1923 |
| 1,651,495 | Watson | Dec. 6, 1927 |
| 1,681,980 | Gross | Aug. 28, 1928 |
| 1,926,741 | Freye et al. | Sept. 12, 1933 |